(12) United States Patent
Cawthorne et al.

(10) Patent No.: US 7,537,542 B2
(45) Date of Patent: May 26, 2009

(54) CONTROL SYSTEM ARCHITECTURE FOR A HYBRID POWERTRAIN

(75) Inventors: William R. Cawthorne, Milford, MI (US); Mario V. Maiorana, Jr., Davisburg, MI (US); Jy-Jen F. Sah, West Bloomfield, MI (US); Sean E Gleason, West Bloomfield, MI (US); Gregory A. Hubbard, Brighton, MI (US); Leonard G. Wozniak, Ann Arbor, MI (US); Matthew T. Boyle, South Lyon, MI (US); Anthony H. Heap, Ann Arbor, MI (US); Aniket Kothari, Southfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 442 days.

(21) Appl. No.: 11/530,615

(22) Filed: Sep. 11, 2006

(65) Prior Publication Data

US 2008/0064559 A1    Mar. 13, 2008

(51) Int. Cl.
*B60K 1/02* (2006.01)
(52) U.S. Cl. ........................................................ 477/3
(58) Field of Classification Search .................... 475/5; 477/3; 701/54; 60/716; 180/65.6, 65.7
See application file for complete search history.

(56) References Cited

U.S. PATENT DOCUMENTS

| | | | | |
|---|---|---|---|---|
| 5,369,584 A | * | 11/1994 | Kajiwara | ...................... 701/48 |
| 5,637,987 A | * | 6/1997 | Fattic et al. | .................... 322/40 |
| 5,903,112 A | * | 5/1999 | Yamada et al. | ................. 318/10 |
| 6,910,329 B2 | * | 6/2005 | Bunting et al. | ................. 60/297 |
| RE39,023 E | * | 3/2006 | Sasaki | ......................... 318/140 |
| 7,007,460 B2 | * | 3/2006 | Frieden et al. | ................ 60/284 |
| 7,243,011 B2 | * | 7/2007 | Koenig et al. | .................. 701/22 |
| 2006/0190155 A1 | * | 8/2006 | Meyer et al. | ................... 701/54 |
| 2007/0161455 A1 | * | 7/2007 | King et al. | ...................... 477/3 |
| 2008/0220934 A1 | * | 9/2008 | Babcock et al. | ................ 477/5 |

* cited by examiner

*Primary Examiner*—Dirk Wright (57) ABSTRACT

A control apparatus for a powertrain system comprising an engine and two electrical machines operably coupled to a two-mode compound-split electro-mechanical transmission is provided. It includes a system controller and two motor control processors. The system controller communicates with the motor control processors via two high speed communications buses and directly-linked serial peripheral interface buses. The motor control processors control flow of electrical power between the electrical machines and an electrical energy storage device. A second control device is operable to control the engine, preferably to control torque output. The internal combustion engine preferably has a crank position sensor which is signally connected to a dedicated input to the second control device and to a dedicated input to the system controller of the first control device.

24 Claims, 4 Drawing Sheets

CONTROL SYSTEM ARCHITECTURE FOR A HYBRID POWERTRAIN

TECHNICAL FIELD

This invention pertains generally to vehicle powertrain systems, and more specifically to a control system for a hybrid transmission system for a vehicle.

BACKGROUND OF THE INVENTION

Various hybrid powertrain architectures are known for managing the input and output torques of various prime-movers in hybrid vehicles, most commonly internal combustion engines and electric machines. Hybrid powertrain systems are generally characterized by an internal combustion engine and one or more electrical machines which provide motive torque to a vehicle driveline using a transmission device.

One parallel-hybrid powertrain architecture comprises a two-mode, compound-split, electro-mechanical transmission which has an input member for receiving motive torque from a source, e.g. an internal combustion engine, and an output member for delivering motive torque from the transmission, typically to a driveline of a vehicle. First and second electrical machines comprising motor/generators provide motive torque to the transmission and are operatively connected to an energy storage device for interchanging electrical power between the storage device and the first and second motor/generators.

Operation of various components and systems of the hybrid powertrain system and the vehicle typically requires a control system using one or more electronic controllers. The controllers are used to control various aspects of the vehicle. The vehicle system requires ongoing control to meet operator demands for driveability and fuel economy, meet system demands related to the hybrid system, including charging and discharging of energy storage devices, provide accessory capability and demands, and meet mandated requirements for emissions and durability.

A designer deciding upon an architecture for a control system of a hybrid system must balance multiple, competing requirements, including providing sufficient computing power to accomplish various vehicle, powertrain and sub-system management tasks in a timely manner while being cost-effective. Other issues include having a control system which meets quality, reliability and durability targets, is able to comply with electromagnetic interference requirements, and is packagable within the vehicle. When multiple controllers are used, communications between the controllers may be constrained by availability and bandwidth of a local area network. There is also a need to have a control system architecture that has a level of reusability, thus being portable to multiple vehicle platforms and systems with minimal redesign. There is a further need to have a control system which is readily expanded to accommodate new features and capabilities during a system life cycle. There is also a need to have a control system which communicates readily with outside systems, to accomplish such tasks as system calibration, programming, and diagnostics.

Therefore, there is a need for an optimized control system architecture for a hybrid powertrain system which effectively uses on-board computing resources to meet the aforementioned requirements.

SUMMARY OF THE INVENTION

It is therefore an object of this invention to provide a hybrid powertrain control system which meets the concerns stated above.

An aspect of the invention comprises a method and control apparatus for a powertrain system comprising an internal combustion engine and a pair of electrical machines each operably coupled to a two-mode compound-split electro-mechanical transmission. The control apparatus includes a first control device comprising a system controller and first and second motor control processors. The system controller is operable to communicate with the first and second motor control processors via a first high speed communications bus, a second high speed communications bus, and, first and second serial peripheral interface buses. The first and second motor control processors are operable to control flow of electrical power between the pair of electrical machines and an electrical energy storage device, based upon input from the system controller. The first and second motor control processors each comprise a power inverter module.

The invention further comprises a second control device operable to control the internal combustion engine, which is operable to execute commands from the system controller to control the internal combustion engine, preferably to control torque output of the internal combustion engine. The internal combustion engine preferably has a crank position sensor which is signally connected to a dedicated input to the second control device and to a dedicated input to the system controller of the first control device using dedicated wire cables.

Another aspect of the invention comprises the two-mode compound-split electro-mechanical transmission having an electrically-powered auxiliary hydraulic pump, wherein the system controller is operable to control the electrically-powered auxiliary hydraulic pump using a dedicated electrical cable directly connected thereto.

Another aspect of the invention comprises a third control device operable to control actuation of a plurality of torque-transfer clutches of the two-mode compound-split electro-mechanical transmission.

A further aspect of the invention comprises the system controller operable to communicate with the second and third control devices via the first high speed communications bus. The system controller is further operable to communicate with a user interface device via the first high speed communications bus. The system controller is preferably operable to determine a commanded torque output for the internal combustion engine, commanded torque outputs for each of the electrical machines, and commanded torques for the plurality of torque-transfer clutches of the transmission. Each commanded torque is based upon operator input readable by the user interface.

A further aspect of the invention comprises a fourth control device operable to control accessory electrical power.

Another aspect of the invention comprises the system controller operable to communicate with the second, third, and fourth control devices via a high speed communications bus.

Another aspect of the invention comprises the system controller operable to communicate directly with the first and second motor control processors using the first and second serial peripheral interface buses, to effect direct serial communications with the first and second motor control processors.

Another aspect of the invention comprises the first high speed communications bus facilitating communications between devices which form a hybrid system local area network.

Another aspect of the invention comprises the second high speed communications bus facilitating communications between devices which form a vehicle local area network.

Another aspect of the invention comprises an article of manufacture for a powertrain system comprising a pair of electrical machines each operable to convert electrical energy to motive torque transmitted to an electro-mechanical transmission. The article of manufacture comprises a control device having a system controller and first and second motor control processors. The system controller is operable to communicate with the first and second motor control processors via first and second serial peripheral interface buses. The first and second motor control processors are operable to control flow of electrical power between the pair of electrical machines and an electrical energy storage device based upon input from the system controller. The system controller is further operable to communicate with the first and second motor control processors via a first high speed communications bus, a second high speed communications bus, and, the first and second serial peripheral interface buses.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
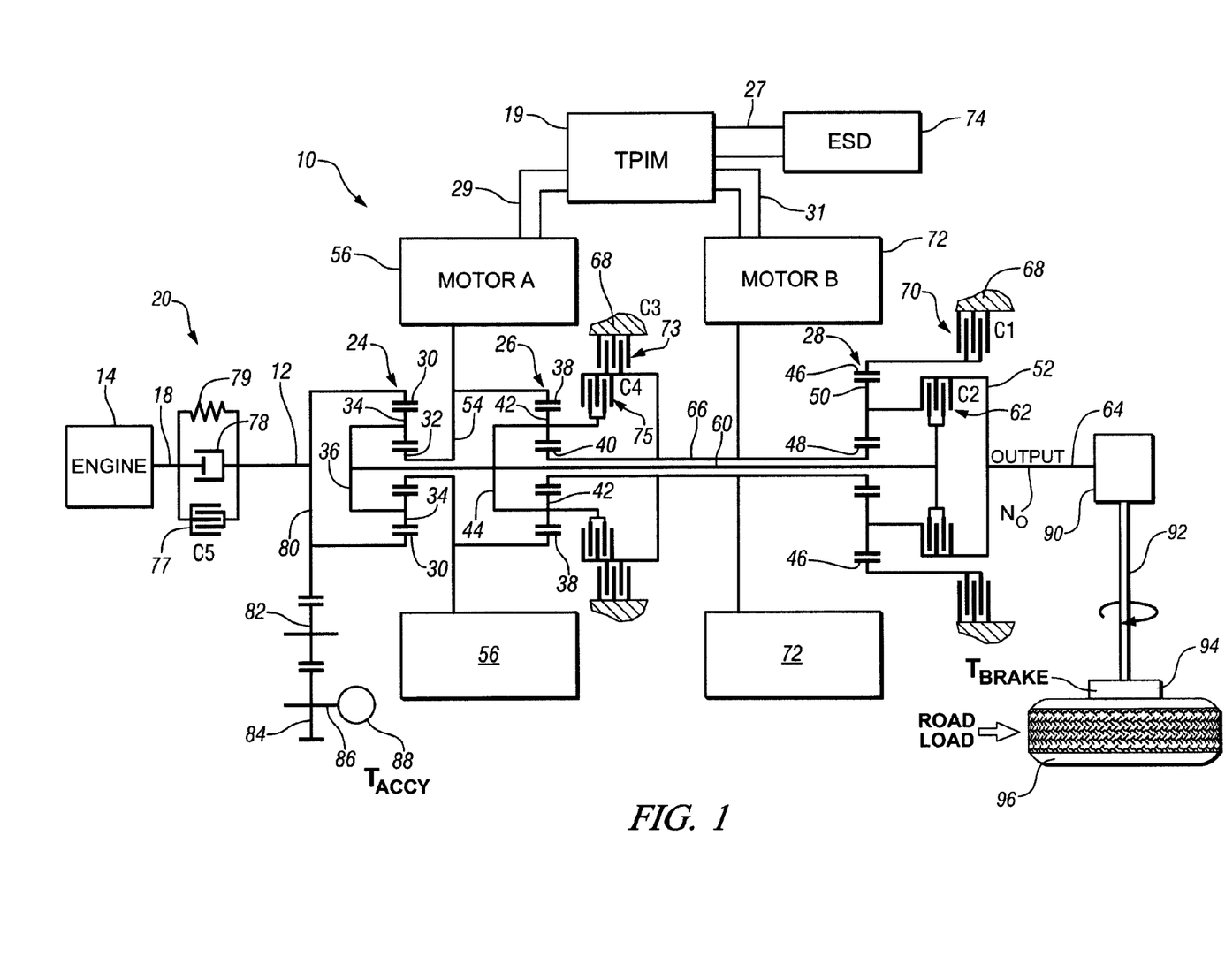
FIG. 1 is a schematic diagram of an exemplary powertrain, in accordance with the present invention.
Figure 2:
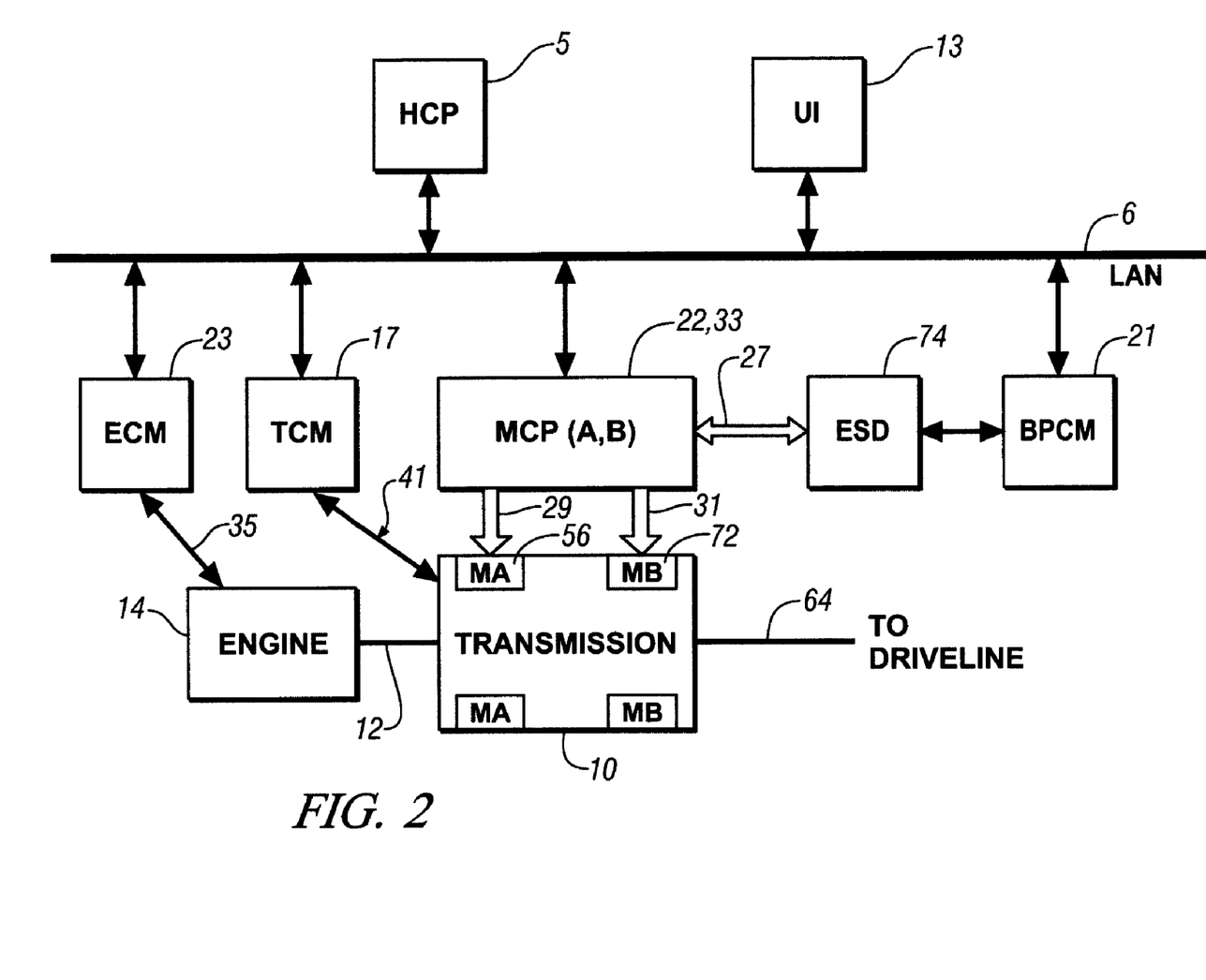
FIG. 2 is a schematic diagram of an exemplary control system architecture and powertrain, in accordance with the present invention; and, FIGS. 3 and 4 are schematic diagrams of aspects of the exemplary control system architecture, in accordance with the present invention.

Referring now to the drawings, wherein the showings are for the purpose of illustrating the invention only and not for the purpose of limiting the same, FIGS. 1 and 2 show a system comprising an engine 14, transmission 10, control system, and driveline which has been constructed in accordance with an embodiment of the present invention.

Mechanical aspects of exemplary transmission 10 are disclosed in detail in commonly assigned U.S. Patent Application Publication No. U.S. 2005/0137042 A1, published Jun. 23, 2005, entitled Two-Mode, Compound-split Hybrid Electro-Mechanical Transmission having Four Fixed Ratios, which is incorporated herein by reference. The exemplary two-mode, compound-split, electro-mechanical hybrid transmission embodying the concepts of the present invention is depicted in FIG. 1, and is designated generally by the numeral 10. The hybrid transmission 10 has an input member 12 that may be in the nature of a shaft which receives motive torque from an internal combustion engine 14. A transient torque damper 20 is incorporated between the output shaft 18 of the engine 14 and the input member 12 of the hybrid transmission 10. The transient torque damper 20 preferably comprises a torque transfer device 77 having characteristics of a damping mechanism and a spring, shown respectively as 78 and 79. The transient torque damper 20 permits selective engagement of the engine 14 with the hybrid transmission 10, but it must be understood that the torque transfer device 77 is not utilized to change, or control, the mode in which the hybrid transmission 10 operates. The torque transfer device 77 preferably comprises a hydraulically operated friction clutch, referred to as clutch C5.

The engine 14 may be any of numerous forms of internal combustion engines, such as a spark-ignition engine or a compression-ignition engine, readily adaptable to provide a power output to the transmission 10 at a range of operating speeds, from idle, at or near 600 revolutions per minute (RPM), to over 6,000 RPM. Irrespective of the means by which the engine 14 is connected to the input member 12 of the transmission 10, the input member 12 is connected to a planetary gear set 24 in the transmission 10.

Referring specifically now to FIG. 1, the hybrid transmission 10 utilizes three planetary-gear sets 24, 26 and 28. The first planetary gear set 24 has an outer gear member 30 that may generally be designated as a ring gear, which circumscribes an inner gear member 32, generally designated as a sun gear. A plurality of planetary gear members 34 are rotatably mounted on a carrier 36 such that each planetary gear member 34 meshingly engages both the outer gear member 30 and the inner gear member 32.

The second planetary gear set 26 also has an outer gear member 38, generally designated as a ring gear, which circumscribes an inner gear member 40, generally designated as a sun gear. A plurality of planetary gear members 42 are rotatably mounted on a carrier 44 such that each planetary gear 42 meshingly engages both the outer gear member 38 and the inner gear member 40.

The third planetary gear set 28 also has an outer gear member 46, generally designated as a ring gear, which circumscribes an inner gear member 48, generally designated as a sun gear. A plurality of planetary gear members 50 are rotatably mounted on a carrier 52 such that each planetary gear 50 meshingly engages both the outer gear member 46 and the inner gear member 48.

Ratios of teeth on ring gears/sun gears are typically based upon design considerations known to skilled practitioners and outside the scope of the present invention. By way of example, in one embodiment, the ring gear/sun gear tooth ratio of the planetary gear set 24 is 65/33; the ring gear/sun gear tooth ratio of the planetary gear set 26 is 65/33; and the ring gear/sun gear tooth ratio of the planetary gear set 28 is 94/34.

The three planetary gear sets 24, 26 and 28 each comprise simple planetary gear sets. Furthermore, the first and second planetary gear sets 24 and 26 are compounded in that the inner gear member 32 of the first planetary gear set 24 is conjoined, as through a hub plate gear 54, to the outer gear member 38 of the second planetary gear set 26. The conjoined inner gear member 32 of the first planetary gear set 24 and the outer gear member 38 of the second planetary gear set 26 are continuously connected to a first motor/generator or electrical machine 56, also referred to as 'Motor A'.

The planetary gear sets 24 and 26 are further compounded in that the carrier 36 of the first planetary gear set 24 is conjoined, as through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, as through a torque transfer device 62 which, as will be hereinafter more fully explained, is employed to assist in the selection of the operational modes of the hybrid transmission 10. The carrier 52 of the third planetary gear set 28 is connected directly to the transmission output member 64.

In the embodiment described herein, wherein the hybrid transmission 10 is used in a land vehicle, the output member 64 is operably connected to a driveline comprising a gear box 90 or other torque transfer device which provides a torque output to one or more vehicular axles 92 or half-shafts (not shown). The axles 92, in turn, terminate in drive members 96. The drive members 96 may be either front or rear wheels of the vehicle on which they are employed, or they may be a drive gear of a track vehicle. The drive members 96 may have some form of wheel brake 94 associated therewith. The drive members each have a speed parameter, $N_{WHL}$, comprising rotational speed of each wheel 96 which is typically measurable with a wheel speed sensor.

The inner gear member 40 of the second planetary gear set 26 is connected to the inner gear member 48 of the third planetary gear set 28, as through a sleeve shaft 66 that circumscribes shaft 60. The outer gear member 46 of the third planetary gear set 28 is selectively connected to ground, represented by the transmission housing 68, through a torque transfer device 70. Torque transfer device 70, as is also hereinafter explained, is also employed to assist in the selection of the operational modes of the hybrid transmission 10. The sleeve shaft 66 is also continuously connected to a second motor/generator or electrical machine 72, also referred to as 'Motor B'.

All the planetary gear sets 24, 26 and 28 as well as the two motor/generators 56 and 72 are coaxially oriented, as about the axially disposed shaft 60. Motor/generators 56 and 72 are both of an annular configuration which permits them to circumscribe the three planetary gear sets 24, 26 and 28 such that the planetary gear sets 24, 26 and 28 are disposed radially inwardly of the motor/generators 56 and 72. This configuration assures that the overall envelope, i.e., the circumferential dimension, of the transmission 10 is minimized.

A torque transfer device 73 selectively connects the sun gear 40 with ground, i.e., with transmission housing 68. A torque transfer device 75 is operative as a lock-up clutch, locking planetary gear sets 24, 26, Motors 56, 72 and the input to rotate as a group, by selectively connecting the sun gear 40 with the carrier 44. The torque transfer devices 62, 70, 73, 75 are all friction clutches, respectively referred to as follows: clutch C1 70, clutch C2 62, clutch C3 73, and clutch C4 75. Each clutch is preferably hydraulically actuated, receiving pressurized hydraulic fluid from a pump. Hydraulic actuation is accomplished using a known hydraulic fluid circuit that is an element of the transmission and not described in detail herein.

The hybrid transmission 10 receives input motive torque from a plurality of torque-generative devices, including the engine 14 and the electrical machines 56 and 72, as a result of energy conversion from fuel or electrical potential stored in an electrical energy storage device (ESD) 74. The ESD 74 typically comprises one or more batteries. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage DC-coupled to motor control processors MPCA 33 and MCPB 22 of transmission power inverter module (TPIM) 19 via DC lines or transfer conductors 27. Motor control processors MPCA 33 and MCPB 22 each comprise power inverters and motor controllers configured to receive motor control commands and control inverter states therefrom for providing motor drive or regeneration functionality. Each power inverter comprises an electrical converter that is operable to convert direct electrical current to alternating electrical current, and alternating electrical current to direct electrical current. The TPIM 19 is an element of the control system described hereinafter with regard to FIG. 2. The TPIM 19 communicates with the first motor/generator 56 by transfer conductors 29, and the TPIM 19 similarly communicates with the second motor/generator 72 by transfer conductors 31. Electrical current is transferable to or from the ESD 74 in accordance with whether the ESD 74 is being charged or discharged.

In motoring control, the respective inverter receives current from the DC lines and provides AC current to the respective motor over transfer conductors 29 and 31. In regeneration control, the respective inverter receives AC current from the motor over transfer conductors 29 and 31 and provides current to the DC lines 27. The net DC current provided to or from the inverters determines the charge or discharge operating mode of the electrical energy storage device 74. Preferably, Motor A 56 and Motor B 72 are three-phase AC machines and the inverters comprise complementary three-phase power electronics operable to convert direct electrical current to alternating electrical current, and alternating electrical current to direct electrical current.

Referring again to FIG. 1, a drive gear 80 may be presented from the input member 12. As depicted, the drive gear 80 fixedly connects the input member 12 to the outer gear member 30 of the first planetary gear set 24, and the drive gear 80, therefore, receives power from the engine 14 and/or the motor/generators 56 and/or 72 through planetary gear sets 24 and/or 26. The drive gear 80 meshingly engages an idler gear 82 which, in turn, meshingly engages a transfer gear 84 that is secured to one end of a shaft 86. The other end of the shaft 86 may be secured to an auxiliary hydraulic/transmission fluid pump and/or power take-off ('PTO') unit, designated either individually or collectively at 88.

Referring now to FIG. 2, a schematic block diagram of the control system, comprising a distributed controller architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and motors 56, 72. The distributed controller architecture comprises a plurality of processors and devices, including a system controller which is referred to herein as hybrid control processor ('HCP') 5, engine control module ('ECM') 23, transmission control module ('TCM') 17, battery pack control module ('BPCM') 21, Accessory Power Module ('APM') 114, and Motor Control Processors ('MCP') 22, 33. The MCP preferably comprises first and second motor control processors, designated as MCPA 33 and MCPB 22. There is a User Interface ('UI') 13 operably connected to a plurality of other devices through which a vehicle operator typically controls or directs operation of the vehicle and powertrain, including the transmission 10. Exemplary devices through which a vehicle operator provides input to the UI 13 include an accelerator pedal, a brake pedal, transmission gear selector, and, vehicle speed cruise control. Each of the aforementioned controllers and devices communicate with other controllers, devices, sensors, and actuators via a high-speed local area network ('LAN') bus, shown generally in FIG. 2 as item 6. The LAN bus 6 allows for structured communication of control parameters and commands between the various processors, controllers, and devices. The specific communication protocol utilized is application-specific. By way of example, one communications protocol is the Society of Automotive Engineers standard J1939. Other communications protocols are known, and not specifically relevant to the invention. The LAN bus and appropriate protocols provide for robust messaging and multi-controller interfacing between the aforementioned controllers, and other controllers providing functionality such as antilock brakes, traction control, and vehicle stability.

The system controller HCP 5 provides overarching control of the hybrid powertrain system, serving to coordinate operation of various devices, including the ECM 23, TCM 17, MCPA 33, MCPB 22, and BPCM 21. Based upon various input signals from the UI 13 and the powertrain, the HCP 5 generates various commands, including: an engine torque command, $T_{E\_CMD}$; clutch torque commands, $T_{CL\_N}$ for the various clutches C1, C2, C3, C4 of the hybrid transmission 10; and motor torque commands, $T_{A\_CMD}$ and $T_{B\_CMD}$, for the electrical Motors A 56 and B 72, respectively. Functions of the HCP 5 typically include: determining system operating constraints and an optimal system operating point(s); determining a transmission range state; determining and controlling a desired engine speed and input speed to the transmission 10; arbitrating output torque of the powertrain; controlling regeneration of the ESD 74; determining optimal engine torque and commanding engine torque to the ECM 23; determining operating state of Engine Start/Stop; commanding operating state of engine displacement-on-demand, when so equipped; commanding operating state of a battery relay for the ESD; interpreting and diagnosing a transmission shift lever position ('PRNDL') range selection sensor; controlling active driveline damping; and, controlling internal combustion engine start. The HCP 5 has responsibility to protect and diagnose system operation, and provide system security by controlling system torque output and range state.

The first and second motor control processors, designated as MCPA 33 and MCPB 22, each comprise a device operable to control operation of the corresponding electrical Motor A, B. It preferably includes a pair of power inverters and motor control processors configured to receive motor control commands and control inverter states therefrom to provide motor drive or regeneration functionality. The MCPA 33 and MCPB 22 preferably execute the following operations: sensing motor and power inverter operation; receiving motor torque commands, $T_{A\_CMD}$ and $T_{B\_CMD}$; controlling engine compression pulse cancellation, determining motor current command for Motors A, B; determining limits for Motors A, B and power inverters; controlling motor current to Motors A, B; determining rotational speeds of Motors A, B; diagnosing faults in the inverters and motors; and acting to protect the motors and power inverters. Furthermore, it provides secondary support for on-board diagnostics (OBD), and system security by controlling motor torques, $T_A$, $T_B$. The MCPA 33 and MCPB 22 are operable to generate torque commands for Motors A and B, $T_{A\_CMD}$ and $T_{B\_CMD}$, based upon input from the HCP 5, which is driven by operator input through UI 13 and system operating parameters. Individual motor speed signals, $N_A$ and $N_B$ for Motor A and Motor B respectively, are derived from the motor phase information or conventional rotation sensors. MCPA 33 and MCPB 22 determine and communicate motor speeds, $N_A$ and $N_B$, to the HCP 5. The electrical energy storage device 74 is high-voltage DC-coupled to MCPA 33 and MCPB 22 via DC lines 27. Electrical current is transferable to or from MCPA 33 and MCPB 22 in accordance with whether the ESD 74 is being charged or discharged.

The ECM 23 comprises a device that is signally and operably connected to the engine 14 via a plurality of discrete lines, collectively shown as aggregate line 35. The ECM 23 functions to acquire data from a variety of sensors and control a variety of actuators, respectively, of the engine 14. The ECM 23 receives the engine torque command, $T_{E\_CMD}$, from the HCP 5, and generates a desired axle torque, $T_{AXLE\_DES}$, and an indication of actual engine torque, $T_{E\_ACT}$, which is communicated to the HCP 5. Various other parameters that may be sensed by ECM 23 include engine coolant temperature, engine input speed ($N_E$) to shaft 14 leading to the transmission, manifold pressure, ambient air temperature, and ambient pressure. Various actuators that may be controlled by the ECM 23 include fuel injectors, ignition modules, and throttle control modules. Other functions of the ECM 23 can include interpreting and diagnosing accelerator pedal input, determining axle torque arbitration, requesting axle torque, determining and communicating engine limits, determining and communicating engine cost, in terms of fuel flow. The ECM generates a Powertrain_Crank_Active signal, which it communicates to the HCP 5. The ECM supports Engine_Start_Stop Mode operation. The ECM preferably reads temperature from a powertrain electronics coolant sensor and drives coolant pumps based upon input from the coolant sensor. The ECM senses various engine inputs, and controls engine torque and emissions, per the above, by actuating ignition spark, fuel, air control, displacement-on-demand (when it is mechanized on the engine), and, executes engine diagnostic routines, including operating as master controller for execution of on-board diagnostics (OBD).

The TCM 17 comprises a device that is operably connected to the transmission 10 and functions to acquire data from a variety of sensors and provide command signals to the transmission via a plurality of discrete lines collectively shown as aggregate line 41. Inputs from the TCM 17 to the HCP 5 include clutch torques, $T_{CL\_N}$, for each of the clutches C1, C2, C3, and, C4 and rotational speed, $N_O$, of the output shaft 64. The TCM preferably operates by executing the following tasks: sensing inputs to the transmission; executing fluid logic valve commands and clutch commands received from the HCP 5 to control hydraulic systems in the transmission 10 in order to control the clutches C1, C2, C3, and, C4; interpreting and diagnosing PRNDL range selection; diagnosing operation of the transmission 10; and, serving as primary controller for execution of transmission OBD. Other actuators and sensors may be used to provide additional information from the TCM to the HCP for control purposes.

The BPCM 21 comprises a device that is signally connected one or more sensors operable to monitor electrical current or voltage parameters of the ESD 74 to provide information about the state of the batteries to the HCP 5. Such information includes battery state-of-charge, Bat_SOC, and other states of the batteries, including voltage, $V_{BAT}$, and available power, $P_{BAT\_MIN}$ and $P_{BAT\_MAX}$. The BPCM is operable to actuate the battery relay and diagnose battery state, including state-of-life, and provides secondary support for OBD systems.

The APM 114 comprises a device that acts to convert 300 volts from the ESD to 12 V and 42 V for use in the vehicle, to provide 12 V accessory power and 42V accessory power. It is operable to convert 12V to 300V to provide jump assist, and is self-diagnosing.

Each of the aforementioned devices and processors is preferably a general-purpose digital computer generally comprising a microprocessor or central processing unit, read only memory (ROM), random access memory (RAM), electrically programmable read only memory (EPROM), high speed clock, analog-to-digital (A/D) and digital-to-analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer.

Algorithms for control and state estimation in each of the devices are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25, 50 and 100 milliseconds during ongoing engine and vehicle operation. Alternatively, algorithms may be executed in response to occurrence of an event.

In response to an operator's action, as captured by the UI 13, the system controller HCP 5 and one or more of the other devices determine required transmission output torque, $T_O$. Selectively operated components of the hybrid transmission 10 are appropriately controlled and manipulated to respond to the operator demand. For example, in the embodiment shown in FIGS. 1 and 2, when the operator has selected a forward drive range and manipulates either the accelerator pedal or the brake pedal, the HCP 5 determines an output torque request for the transmission based upon input to the UI 13 which read by the ECM 23. This affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

The two-mode, compound-split, electro-mechanical hybrid transmission, includes output member 64 which receives output power through two distinct gear trains within the transmission 10, and operates in several transmission operating modes, described with reference now to FIG. 1, Table 1 is shown below:

TABLE 1

| Transmission Operating Mode | Actuated Clutches | |
| --- | --- | --- |
| Mode I | C1 70 | |
| Fixed Ratio 1 | C1 70 | C4 75 |
| Fixed Ratio 2 | C1 70 | C2 62 |
| Mode II | C2 62 | |
| Fixed Ratio 3 | C2 62 | C4 75 |
| Fixed Ratio 4 | C2 62 | C3 73 |

The various transmission operating modes described in the table indicate which of the specific clutches C1, C2, C3, and C4 are engaged or actuated for each of the operating modes. Additionally, in various transmission operating modes, Motor A 56 or Motor B 72 may each operate as electrical motors, designated as MA, MB respectively, and whether motor A 56 is operating as a generator, designated as GA. A first mode, or gear train, is selected when the torque transfer device 70 is actuated in order to "ground" the outer gear member 46 of the third planetary gear set 28. A second mode, or gear train, is selected when the torque transfer device 70 is released and the torque transfer device 62 is simultaneously actuated to connect the shaft 60 to the carrier 52 of the third planetary gear set 28. Other factors outside the scope of the invention affect when the electrical machines 56, 72 operate as motors and generators, and are not discussed herein.

The control system, shown in FIG. 2, is operable to provide a range of transmission output speeds, $N_O$, of shaft 64 from relatively slow to relatively fast within each mode of operation. The combination of two modes with a slow-to-fast output speed range in each mode allows the transmission 10 to propel a vehicle from a stationary condition to highway speeds, and meet various other requirements as previously described. Additionally, the control system coordinates operation of the transmission 10 so as to allow synchronized shifts between the modes.

The first and second modes of operation refer to circumstances in which the transmission functions are controlled by one clutch, i.e. either clutch C1 62 or C2 70, and by the controlled speed and torque of the motor/generators 56 and 72. Certain ranges of operation are described below in which fixed ratios are achieved by applying an additional clutch. This additional clutch may be clutch C3 73 or C4 75, as shown in the table, above.

When the additional clutch is applied, fixed ratio of input-to-output speed of the transmission, i.e. $N_I/N_O$, is achieved. The rotations of the motor/generators 56, 72 are dependent on internal rotation of the mechanism as defined by the clutching and proportional to the input speed, $N_I$, determined or measured at shaft 12. The motor/generators function as motors or generators. They are completely independent of engine to output power flow, thereby enabling both to be motors, both to function as generators, or any combination thereof. This allows, for instance, during operation in Fixed Ratio 1 that motive power output from the transmission at shaft 64 is provided by power from the engine and power from Motors A and B, through planetary gear set 28 by accepting power from the energy storage device 74.

The transmission operating mode can be switched between Fixed Ratio operation and Mode operation by activating or deactivating one the additional clutches during Mode I or Mode II operation. Determination of operation in fixed ratio or mode control is by algorithms executed by the control system, and is outside the scope of this invention.

The modes of operation may overlap the ratio of operation, and selection depends again on the driver's input and response of the vehicle to that input. RANGE 1 falls primarily within mode I operation when clutches C1 70 and C4 75 are engaged. RANGE 2 falls within mode I and mode II when clutches C2 62 and C1 70 are engaged. A third fixed ratio range is available primarily during mode II when clutches C2 62 and C4 75 are engaged, and a fourth fixed ratio range is available during mode II when clutches C2 62 and C3 73 are engaged. It is notable that ranges of operation for Mode I and Mode II typically overlap significantly.

Output of the exemplary powertrain system described hereinabove is constrained due to mechanical and system limitations. The output speed, $N_O$, of the transmission measured at shaft 64 is limited due to limitations of engine output speed, $N_E$, measured at shaft 18, and transmission input speed, $N_I$, measured at shaft 12, and speed limitations of the electric motors A and B, designated as $+/-N_A$, $+/-N_B$. Output torque, $T_O$, of the transmission 64 is similarly limited due to limitations of the engine input torque, $T_E$, and input torque, $T_I$, measured at shaft 12 after the transient torque damper 20, and torque limitations ($T_{A\_MAX}$, $T_{A\_MIN}$, $T_{B\_MAX}$, $T_{B\_MIN}$) of the motors A and B 56, 72.

Figure 3:
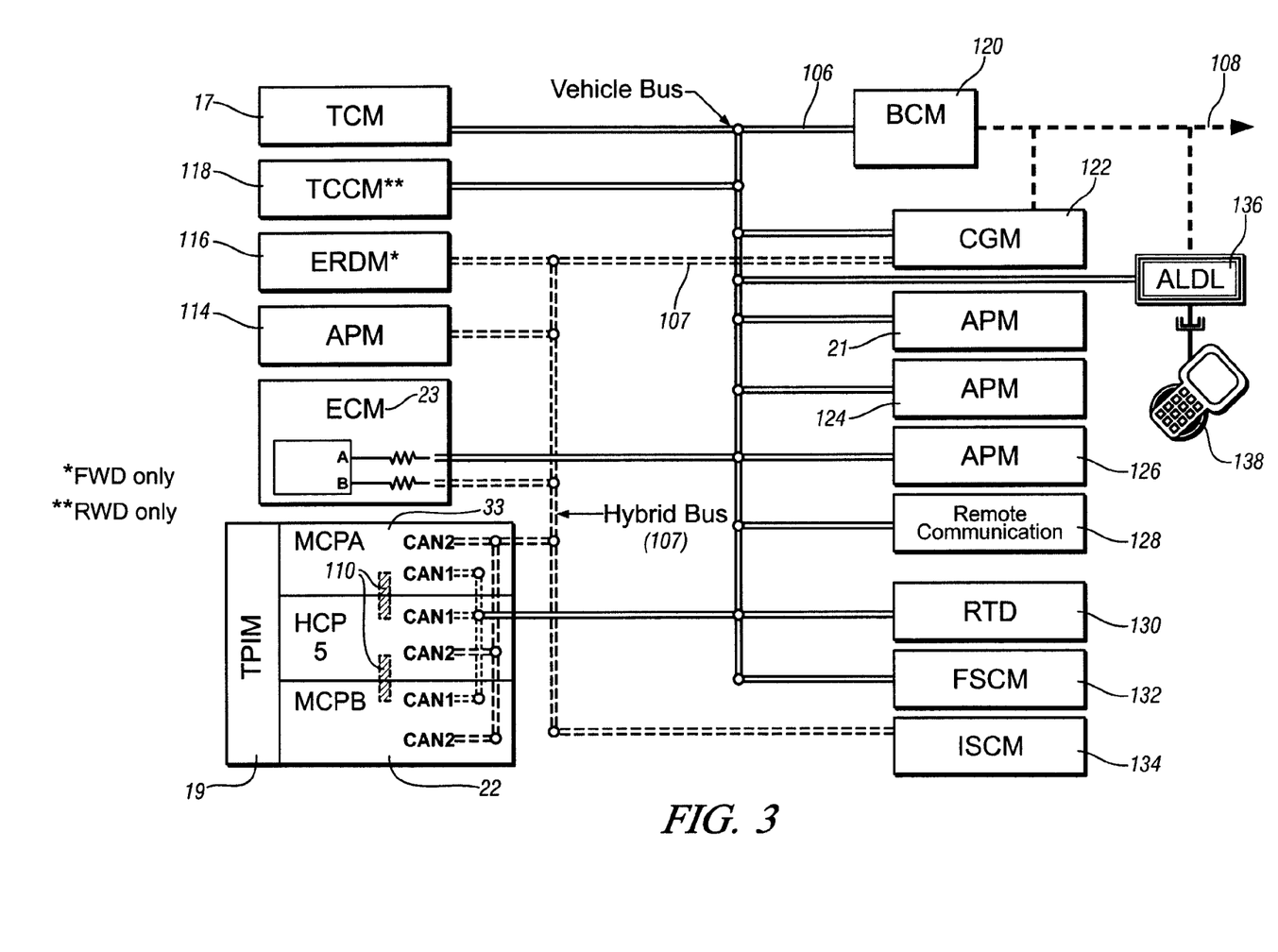

Referring now to FIG. 3, an embodiment of an architecture for a control system for controlling the powertrain system of FIGS. 1 and 2 is shown. The powertrain system preferably comprises internal combustion engine 14 and electrical machines, i.e., Motor A, B 56, 72, operably coupled to two-mode compound-split electro-mechanical transmission 10 to provide motive torque to a vehicle. The various devices and processors are signally connected via two high-speed, dual-wire local area network (LAN) buses, including a vehicle bus 106, and a hybrid bus 107. There is also a low-speed LAN bus 108 that signally connects to an assembly line diagnostics link ('ALDL') 136, that is connectable to a remote device 138, including devices such as computers and handheld diagnostic tools used by assembly plant technicians and service technicians to communicate with the control system of the vehicle. The ALDL 136 is also preferably signally connected to the vehicle bus 106.

The following devices are signally connected via the vehicle bus 106: TCM 17, optional Transfer Case Control Module (TCCM) 118 when the vehicle system comprises a rear-wheel drive vehicle; optional Electric Rear Axle Drive Module (ERDM) 116 when the vehicle system comprises a front-wheel drive vehicle; ECM 23; TPIM 19, which comprises a single controller device which comprises HCP 5, MCPA 33, MCPB 22; Fuel System Control Module (FSCM) 132; Real-time Damping Module (RTDM) 130; Remote Communications Device 128; Electronic Brake Control Module (EBCM) 126; Electric Power Steering (EPS) 124; Battery Pack Control Module (BPCM) 21, Communication Gateway Module (CGM) 122; Body Control Module (BCM) 120.

The following devices are signally connected via the hybrid bus 106: ECM 23; TPIM 19, including HCP 5, MCPA 33, MCPB 22; Inertial Sensor Control Module (ISCM) 134; Accessory Power Module (APM) 114; optional Electric Rear Axle Drive Module (ERDM) 116 when the vehicle system comprises a front-wheel drive vehicle; Communication Gateway Module (CGM) 122; Electronic Brake Control Module (EBCM) 126.

The TPIM 19, comprising the single controller device HCP 5, MCPA 33, MCPB 22 preferably comprises a single integrated circuit which includes the processor devices for the HCP, MCPA, and MCPB. There is a first serial peripheral interface bus ('SPI') 110 between HCP and MCPA, and a second SPI bus 110 between the HCP and MCPB. Each SPI bus comprises a full-duplex synchronous serial data link permitting direct communication between the devices, wherein the HCP, as a master device, is operable to communicate device control data directly to the MCPA or the MCPB. The system controller HCP 5 directly signally communicates individually to the MCPA 33 and the MCPB 22 via the first and second SPI buses 110, thus achieving high-speed communications between the devices without waiting for communications to occur via the vehicle bus 106 or the hybrid bus 107. Specific details of SPI communications are known to a skilled practitioner and not discussed in detail herein. In this embodiment, messages are typically sent from the HCP to the MCPA and MCPB over the vehicle bus 106 and the hybrid bus 107 each 6.25 millisecond loop.

Figure 4:
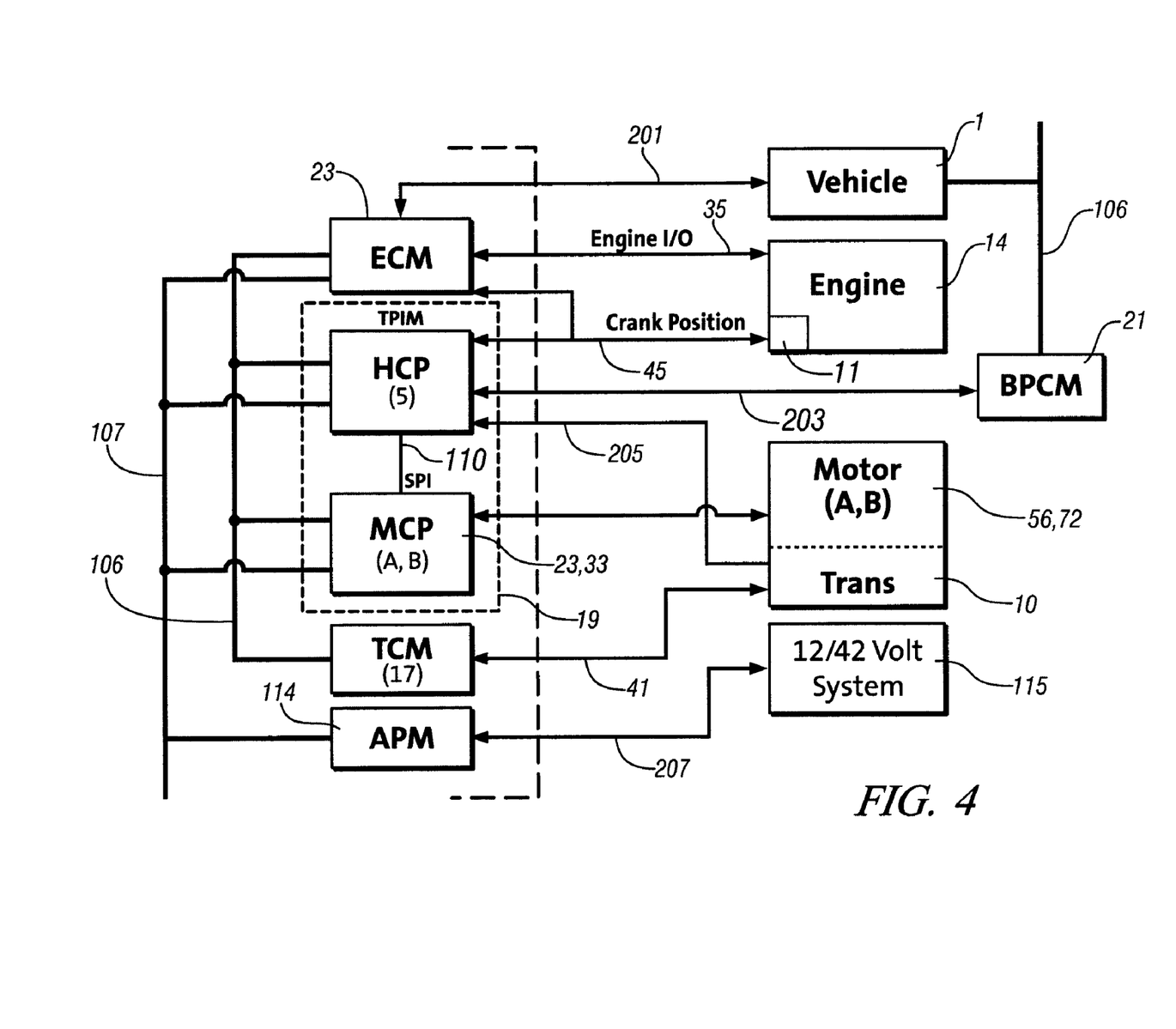

Referring now to FIG. 4, additional details of the architecture for the control system for controlling the powertrain system of FIGS. 1 and 2 are shown. The devices shown in FIG. 4 having reference numerals common to FIGS. 1, 2, and 3 comprise the same or analogous devices. FIG. 4 shows in greater detail a specific arrangement of devices and modules, and emphasizing communications links between the control devices and various components of the powertrain system and the vehicle system. The powertrain system preferably comprises the internal combustion engine 14 and the electrical machines, i.e. Motors A, B 56, 72, operably coupled to the two-mode compound-split electro-mechanical transmission 10 to provide motive torque to vehicle 1. The control system comprises a plurality of control devices signally connected via two high-speed, dual-wire local area network (LAN) buses, including the vehicle bus 106, and the hybrid bus 107.

The control system for the powertrain system preferably comprises the following control devices: ECM 23; TPIM 19, which comprises a single controller device including HCP 5, MCPA 33, and MCPB 22; TCM 17; and, APM 114. The vehicle bus 106 provides a first communications link between ECM 23, HCP 5, MCPA 33, MCPB 22, TCM 17, as well as vehicle 1 and BPCM 21. The hybrid bus 107 provides a second communications link between ECM 23, HCP 5, MCPA 33, MCPB 22, and APM 114.

The exemplary system provides for direct electrical signal connection between various elements of the powertrain system and specific control devices, to facilitate communication of information outside normal channels afforded by the vehicle bus 106 and the hybrid bus 107, preferably at a faster update rate. This facilitates improved system control. The ECM 23 is directly connected to the engine 14 via the plurality of discrete lines collectively shown as aggregate line 35. One of those lines is distinctly shown apart from aggregate line 35, comprising a wire cable that is a signal line 45 from engine crank position sensor 11. The signal line 45 from engine crank position sensor 11 is directly wired in parallel to the HCP 5, to provide direct signal information from crank position sensor 11 to the HCP for improved system control. The ECM 23 is preferably further directly connected to the vehicle 1 via aggregate line 201 in order to monitor coolant temperature, coolant level, and a hood switch, and to effect control of one or more coolant flow pumps. The HCP 5 is preferably further directly connected to the BPCM 21 via aggregate lines 203 in order to control battery contactors, and to execute a high-voltage interlock protection system to prevent risk of exposure to high voltage levels. The HCP is preferably further directly connected to the transmission 10 via aggregate line 205 to have redundant inputs from the PRNDL sensor, and to provide control for an electrically-powered auxiliary hydraulic pump (not shown) which is operable to deliver pressurized hydraulic fluid to the hydraulic circuit of the transmission 10. The aggregate line 205 includes a dedicated wire cable between the HCP 5 and the auxiliary hydraulic pump to provide direct control from the HCP 5 to the electrically-powered auxiliary hydraulic pump. The HCP is able to directly actuate the auxiliary hydraulic pump via the dedicated wire cable.

The TCM 17 is preferably directly connected to the transmission 10 via a plurality of discrete lines collectively shown as aggregate line 41. The APM 114 is preferably directly connected to a 12/42 $V_{DC}$ electrical system 115 via a plurality of discrete lines collectively shown as aggregate line 207 to provide electrical charging of a 12 $V_{DC}$ battery, to regulate operation of a 42 $V_{DC}$ system, and to provide assistance in jump-starts. The HCP 5 is directly connected to MCPA and MCPB via first and second SPI buses 110.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Control apparatus for a powertrain system comprising an internal combustion engine and a pair of electrical machines each operably coupled to a two-mode compound-split electro-mechanical transmission, comprising:
a first control device comprising a system controller and first and second motor control processors;
the system controller operable to communicate with the first and second motor control processors via a first high speed communications bus, a second high speed communications bus, and, first and second serial peripheral interface buses; and,
the first and second motor control processors operable to control flow of electrical power between the pair of electrical machines and an electrical energy storage device, based upon input from the system controller.

2. The control apparatus of claim 1, further comprising: a second control device operable to control the internal combustion engine.

3. The control apparatus of claim 2, further comprising: the second control device operable to execute commands from the system controller to control the internal combustion engine.

4. The control apparatus of claim 3, wherein the second control device operable to execute commands from the system controller to control the internal combustion engine further comprises the second control device operable to control torque output of the internal combustion engine.

5. The control apparatus of claim 2, further comprising: a third control device operable to control actuation of a plurality of torque-transfer clutches of the two-mode compound-split electro-mechanical transmission.

6. The control apparatus of claim 5, further comprising the system controller operable to communicate with the second and third control devices via the first high speed communications bus.

7. The control apparatus of claim 6, further comprising the system controller operable to communicate with a user interface device via the first high speed communications bus.

8. The control apparatus of claim 7, further comprising the system controller operable to determine: a commanded torque output for the internal combustion engine; commanded torque outputs for each of the electrical machines; and,
commanded torques for the plurality of torque-transfer clutches of the transmission, each commanded torque output based upon operator input determined using the user interface.

9. The control apparatus of claim 5, further comprising the system controller operable to control accessory electrical power.

10. The control apparatus of claim 9, wherein the first and second motor control devices via the first high speed communications bus.

11. The control apparatus of claim 2, wherein the powertrain system further comprises the internal combustion engine having a crank position sensor, comprising:
the crank position sensor signally connected to:
the second control device using a dedicated electrical cable; and,
the system controller of the first control device using a dedicated electrical cable.

12. The control apparatus of claim 11, wherein the powertrain system further comprises the two-mode compound-split electro-mechanical transmission including an electrically-powered auxiliary hydraulic pump, comprising:
the system controller operable to control the electrically-powered auxiliary hydraulic pump using a dedicated electrical cable connected thereto.

13. The control apparatus of claim 1, wherein the system controller operable to communicate with the first and second motor control processors via first and second serial peripheral interface buses comprises the system controller operable to effect direct communications with the first and second motor control processors.

14. The control apparatus of claim 1, wherein the first and second motor control processors operable to control flow of electrical power between the pair of electrical machines and an electrical energy storage device based upon input from the system controller further comprise:
the first and second motor control processors operable to transmit electrical energy stored in the electrical energy storage device to the electrical machines for conversion to motive torque.

15. The control apparatus of claim 14, wherein the first and second motor control processors operable to control flow of electrical power between the pair of electrical machines and an electrical energy storage device based upon input from the system controller further comprise:
the first and second motor control processors operable to transmit electrical energy generated by the electrical machines to the electrical energy storage device.

16. Article of manufacture for a powertrain system comprising a pair of electrical machines each operable to convert electrical energy to motive torque transmitted to an electro-mechanical transmission, comprising:
a control device comprising a system controller and first and second motor control processors;
the system controller operable to communicate with the first and second motor control processors via first and second serial peripheral interface buses; and,
the first and second motor control processors operable to control flow of electrical energy between the pair of electrical machines and an electrical energy storage device based upon input from the system controller.

17. The article of manufacture of claim 16, wherein the system controller is further operable to communicate with the first and second motor control processors via a first high speed communications bus, a second high speed communications bus, and, the first and second serial peripheral interface buses.

18. The article of manufacture of claim 17, wherein the electro-mechanical transmission comprises a two-mode, compound-split electro-mechanical transmission comprising a plurality of torque-transfer clutches.

19. The article of manufacture of claim 18, wherein:
the electro-mechanical transmission includes an electrically-powered auxiliary hydraulic pump; and,
the system controller is operable to control the electrically-powered auxiliary hydraulic pump using a dedicated electrical cable directly connected thereto.

20. The article of manufacture of claim 19, wherein the powertrain system further comprises an internal combustion engine comprising a crank position sensor, wherein the crank position sensor is signally connected to the system controller of the first control device using a first dedicated electrical cable, and signally connected to an engine control device using a second dedicated electrical cable.

21. Method for controlling a powertrain system comprising a system controller and first and second motor control processors operable to control a pair of electrical machines, the first and second motor control processors operable to control flow of electrical power between the pair of electrical machines and an electrical energy storage device, the method comprising:
- communicating between the system controller and each of the first and second motor control processors using a first high speed communications bus,
- communicating between the system controller and each of the first and second motor control processors using a second high speed communications bus, and,
- communicating between the system controller and the first and second motor control processors using first and second serial peripheral interface buses.

22. The method of claim 21, further comprising: executing commands communicated from the system controller to a second control device operable to control an internal combustion engine.

23. The method of claim 22, wherein the powertrain system further comprises the internal combustion engine and the pair of electrical machines each operable to provide motive torque to a two-mode, compound-split electro-mechanical transmission, the method further comprising:
- communicating a signal output from a crank position sensor of the internal combustion engine directly to the second control device; and,
- communicating the signal output from the crank position sensor of the internal combustion engine directly to the system controller.

24. The method of claim 23, wherein the two-mode, compound-split electro-mechanical transmission further comprises an electrically-powered auxiliary hydraulic fluid pump, the method further comprising:
- controlling the auxiliary hydraulic fluid pump using an output signal directly communicated from the system controller.

* * * * *